United States Patent [19]

van Erp et al.

[11] 4,383,981
[45] May 17, 1983

[54] PROCESS FOR THE SEPARATION OF CRYSTALLINE SILICATES

[75] Inventors: Willibrord A. van Erp; Otto M. Velthuis, both of Amsterdam, Netherlands

[73] Assignee: Shell Oil Company, Houston, Tex.

[21] Appl. No.: 343,674

[22] Filed: Jan. 28, 1982

[30] Foreign Application Priority Data

Mar. 5, 1981 [NL] Netherlands .......................... 8101061

[51] Int. Cl.$^3$ ...................... C01B 33/20; C01B 33/26; B01D 37/00
[52] U.S. Cl. ................................... 423/326; 423/327; 210/702; 210/710; 210/728
[58] Field of Search ............... 423/326, 328, 329, 330; 210/702, 710, 728, 778

[56] References Cited

U.S. PATENT DOCUMENTS

| | | | |
|---|---|---|---|
| 2,386,337 | 10/1945 | Moyer | 423/335 |
| 3,516,786 | 6/1970 | Maher et al. | 423/329 |
| 3,702,886 | 11/1972 | Argauer et al. | 423/328 |
| 4,102,774 | 7/1978 | Carr et al. | 210/729 |

FOREIGN PATENT DOCUMENTS 1018264  1/1966  United Kingdom ................ 423/328

OTHER PUBLICATIONS

Iler, R. K., *The Colloidal Chemistry of Silica and Silicates*, Ithaca, N.Y., Cornell Univ. Press, 1955, p. 161.

*Primary Examiner*—O. R. Vertiz
*Assistant Examiner*—Steven Capella
*Attorney, Agent, or Firm*—John M. Duncan

[57] ABSTRACT

Fine-crystalline silicates are separated by filtration from an aqueous mother liquor which contains at least 30% v of a water-miscible alcohol, ketone, sulphoxide or cyclic ether which, per molecule, contain at most five carbon atoms with a boiling point below 85° C.

9 Claims, No Drawings

PROCESS FOR THE SEPARATION OF CRYSTALLINE SILICATES

BACKGROUND OF THE INVENTION

The invention relates to a process for the separation by filtration of a crystalline silicate from the aqueous reaction mixture in which the silicate is present after the crystallization.

Crystalline silicates may be prepared starting from an aqueous mixture containing a silicon compound and alkali metal ions. The preparation takes place by maintaining the mixture at elevated temperature until the silicate has crystallized out and subsequently separating the crystals of the silicate from the mother liquor, washing, drying and calcining them. By incorporating compounds of certain trivalent metals into the aqueous mixture from which the silicates are prepared, crystalline silicates that contain the metals concerned may be obtained. Examples of such metals are aluminum, iron, gallium, rhodium, chromium and scandium. For the preparation of crystalline silicates with a certain crystal structure, organic cations such as quaternary alkylammonium ions are sometimes incorporated into the aqueous mixture from which the silicates are prepared. By varying the molar ratio in which the various reaction components are incorporated into the starting mixture the average crystallite size of the silicates to be prepared can be controlled.

Crystalline silicates are used on a large scale in industry, inter alia as adsorbents and as catalysts and catalyst carriers. In these applications the average crystallite size is often an important factor. As a rule, the crystalline silicates are more suitable for the above applications according as they have a smaller average crystallite size. In the preparation of fine-crystalline silicates on a technical scale, separation of the silicates from the aqueous reaction mixture in which they are present after the crystallization is a serious problem. It has been found that for the separation of fine-crystalline silicates from the aqueous mixture in which they are present after the crystallization, filtration is not a suitable process. When a filtering material with a relatively coarse structure is used, the crystalline silicate passes the filter unhindered. When a filtering material with a relatively fine structure is used, complete blockage of the filter by the crystalline silicate occurs very rapidly. It is true that the fine-crystalline silicates can be separated from the reaction mixture by centrifuging, but this separation technique is not suitable for use on a technical scale because of the high cost involved.

U.S. Pat. No. 3,516,786 discloses that in the preparation of crystalline aluminosilicates, improved crystallinity and a larger surface area are obtained by adding 0.1–20%v of a water-miscible organic solvent to the reaction mixture before crystallization. Netherlands patent application No. 7,610,763 (equivalent: G.B. Pat. No. 1,553,209) discloses that in the preparation of crystalline aluminosilicates, a high $SiO_2/Al_2O_3$ molar ratio can be obtained by including one or more alcohols in the aqueous base reaction mixture.

Applicants have now discovered that fine-crystalline silicates are easily separated by filtration from the aqueous mixture in which they are present after the crystallization, if it is ensured that the mixture which is subjected to the filtration contains an organic solvent that is miscible with water. The amount of organic solvent present in the mixture to be filtered should be at least 30%v, based on the mixture to be filtered. The organic solvent should be chosen from the group formed by monovalent alcohols, ketones, sulphoxides and cyclic ethers which, per molecule, contain at most five carbon atoms.

SUMMARY OF THE INVENTION

A process is disclosed for separating by filtration a fine-crystalline silicate from an aqueous reaction mixture in which the silicate is present after the crystallization, which comprises including in the mixture to be filtered at least 30%v (based on said mixture) of an organic solvent that is miscible with water, which organic solvent has been selected from the group consisting of monohydric alcohols, ketones, sulphoxides and cyclic ethers which, per molecule, contain at most five carbon atoms; filtering said reaction mixture; and recovering the fine-crystalline silicate from the filter.

DESCRIPTION OF PREFERRED EMBODIMENTS

The present patent application therefore relates to a process for the separation by filtration of a fine-crystalline silicate from the aqueous mixture in which the silicate is present after the crystallization, the mixture to be filtered containing at least 30%v (based on the said mixture) of an organic solvent that is miscible with water, which organic solvent has been chosen from the group formed by monovalent alcohols, ketones, sulphoxides and cyclic ethers which, per molecule, contain at most five carbon atoms.

The process according to the invention is preeminently suitable for the separation of fine-crystalline silicates with an average crystallite size of less than 750 nm and in particular less than 500 nm.

As mentioned already hereinbefore, the average crystallite size of crystalline silicates is often an important factor with respect to their suitability for a certain use. An example of a class of crystalline silicates where this applies to a high degree is the crystalline aluminum silicates, which are characterized in that after one hour's calcining in air at 500° C. they have the following properties:

(a) a thermal stability of at least 600° C.;
(b) an X-ray powder diffraction pattern showing as the strongest lines the four lines given in Table A:

TABLE A

| d(Å) | Relative intensity |
|---|---|
| 11.1 ± 0.2 | VS |
| 10.0 ± 0.2 | VS |
| 3.84 ± 0.07 | S |
| 3.72 ± 0.06 | S | where VS=very strong and S=strong;

(c) in the formula representing the composition of the silicate, expressed in moles of the oxides, the $SiO_2/Al_2O_3$ molar ratio is higher than 10.

The complete X-ray powder diffraction pattern of a crystalline aluminum silicate belonging to this class is given in Table B.

TABLE B

| d(Å) | Relative intensity | d(Å) | Relative intensity |
|---|---|---|---|
| 11.1 | 100 | 3.84 (D) | 57 |
| 10.0 | 70 | 3.70 (D) | 31 |
| 8.93 | 1 | 3.63 | 16 |
| 7.99 | 1 | 3.47 | <1 |

TABLE B-continued

| d(Å) | Relative intensity | d(Å) | Relative intensity |
|---|---|---|---|
| 7.42 | 2 | 3.43 | 5 |
| 6.68 | 7 | 3.34 | 2 |
| 6.35 | 11 | 3.30 | 5 |
| 5.97 | 17 | 3.25 | 1 |
| 5.70 | 7 | 3.05 | 8 |
| 5.56 | 10 | 2.98 | 11 |
| 5.35 | 2 | 2.96 | 3 |
| 4.98 (D) | 6 | 2.86 | 2 |
| 4.60 | 4 | 2.73 | 2 |
| 4.35 | 5 | 2.60 | 2 |
| 4.25 | 7 | 2.48 | 3 |
| 4.07 | 2 | 2.40 | 2 |
| 4.00 | 4 | | |

(D) = doublet.

In this patent application the term "crystalline silicate with a thermal stability of at least t° C." is meant to denote a silicate whose X-ray powder diffraction pattern does not change substantially when the silicate is heated to a temperature of t° C.

Crystalline aluminum silicates belonging to the above-mentioned class can be prepared from an aqueous starting mixture containing the following compounds: one or more compounds of an alkali metal (M), one or more quaternary alkylammonium compounds ($R_4NX$), one or more silicon compounds and one or more aluminum compounds. The preparation is carried out by maintaining the mixture at elevated temperature until the silicate has crystallized out and subsequently separating the crystals of the silicate from the mother liquor, washing, drying and calcining them. In the aqueous mixture from which the crystalline aluminum silicates are prepared, the various compounds should be present in the following ratios, expressed in moles of the oxides:

$M_2O:SiO_2 = 0.01-0.35$, $(R_4N)_2O:SiO_2 = 0.01-0.4$, $SiO_2:Al_2O_3 > 10$, and $H_2O:SiO_2 = 5-65$.

By varying the $(R_4N)_2O/SiO_2$ molar ratio in the starting mixture the average crystallite size of the crystalline aluminum silicates to be prepared can be controlled to the effect that crystalline aluminum silicates with a smaller average crystallite size are obtained according as a higher $(R_4N)_2O/SiO_2$ molar ratio is used in the starting mixture. An important property of the crystalline aluminum silicates belonging to this class is their suitability as catalyst in the conversion of aliphatic organic compounds such as methanol into aromatic hydrocarbons. These crystalline aluminum silicates have been found to be more suitable for the said use according as they have a smaller average crystallite size. Especially the crystalline aluminum silicates have been found to be more suitable for the said use according as they have a smaller average crystallite size, preferably with an average crystallite size of less than 750 nm.

In the process according to the invention it should be ensured that the mixture to be filtered contains at least 30%v (based on the said mixture) of the organic solvent that is miscible with water. Preferably the mixture to be filtered contains at least 35%v of the organic solvent. Further, the mixture to be filtered preferably contains at most 60%v and in particular at most 55%v of the organic solvent.

The only compounds suitable for use in the process according to the invention are water-miscible monoalcohols, ketones, sulphoxides and cyclic ethers which, per molecule, contain at most five carbon atoms. Other oxygen-containing organic solvents which are closely related to those mentioned above, but in one or more respects are not in conformity with the given definition are not suitable for the present purpose. It has, for instance, been found that organic acids such as formic acid, aldehydes such as acetaldehyde, polyhydric alcohols such as glycol, monohydric alcohols with a large alkyl radical such as n-hexanol, and aliphatic ethers such as diethyl ether are not suitable for the present purpose. Examples of suitable organic solvents which can be used in the process according to the invention are aliphatic monoalcohols such as methanol, ethanol, n-propanol, isopropanol and allyl alcohol, aliphatic ketones such as acetone and methyl ethyl ketone, sulphoxides such as dimethyl sulphoxide, and cyclic ethers such as tetrahydrofuran.

The organic solvent used in the process according to the invention contains preferably at most four carbon atoms.

In principle, the organic solvent may be added to the reaction mixture at any stage of the silicate preparation, i.e., before or after the crystallization. The organic solvent is preferably added after the silicate has crystallized out.

In the process according to the invention the organic solvent has the function of an auxiliary substance which, in principle, is not consumed and which can therefore, after having fulfilled this function, be used again for the purpose envisaged. To this end, the organic solvent will in most cases first have to be separated from the filtrate. If it is intended to effect this separation by distillation, the preferred organic solvent in the process according to the invention will be a solvent with a boiling point below that of water and in particular with a boiling point lower than 85° C. Very suitable organic solvents are, in this case, those with a boiling point between 50° and 80° C., such as methanol (65° C.), ethanol (79° C.), acetone (56° C.) and tetrahydrofuran (67° C.).

An earlier investigation by the applicants concerning the preparation of crystalline silicates using a quaternary alkylammonium compound as reaction component in the aqueous mixture from which these crystalline silicates are prepared, has shown that only a small part of the amount of quaternary alkylammonium compound used in the aqueous mixture is incorporated into the silicate, the rest remaining substantially unchanged in the mother liquor. It has further been found that the mother liquor originating from a previous silicate preparation can be used without any objection as starting liquid for a following silicate preparation by incorporating in it the desired amounts of the various reaction components; for the quaternary alkylammonium compound it will suffice to incorporate an amount corresponding with that consumed in a previous silicate preparation. Re-use of the mother liquor from a previous silicate preparation in view of the presence of usable reaction components in it, makes the preparation of the crystalline silicates considerably cheaper, especially when this mother liquor contains relatively expensive compounds such as quaternary alkylammonium compounds.

If it is intended to use the invention that is the subject of the present patent application in a silicate preparation with re-use of the mother liquor from a previous silicate preparation, the separation of the organic solvent from the filtrate can be omitted.

If the organic solvent takes part in the silicate preparation as reaction component, so much of it should be present in the aqueous mixture from which the silicate is prepared that after the crystallization there is still an amount of at least 30%v left, based on the mixture to be filtered. If the filtrate is used again in a following silicate preparation, in this case the organic solvent in the filtrate should be replenished to compensate for the amount consumed. In those cases where the organic solvent does not take part in the silicate preparation as reaction component, decomposition and evaporation will nevertheless cause some loss of solvent, which must be replaced.

The invention will now be explained with reference to the following example.

EXAMPLE

Two crystalline aluminum silicates (silicates 1 and 2) were prepared as follows: Two mixtures of NaOH, $(C_3H_7)_4NOH$, amorphous silica, $NaAlO_2$ and water, with a molar composition of:

$$25SiO_2.1Na_2O.4.5[(C_3H_7)_4N]_2O.0.106Al_2O_3.450H_2O$$

for the preparation of silicate 1, and of:

$$25SiO_2.1Na_2O.5.5[(C_3H_7)_4N]_2O.0.006Al_2O_3.450H_2O$$

for the preparation of silicate 2, were heated for 24 hours at 150° C. in an autoclave under autogenous pressure.

The first reaction mixture was divided up into 16 equal samples (samples 1–16) and the second reaction mixture was divided up into four equal samples (samples 17–20). The 20 samples of reaction mixture were subjected to the following experiments.

EXPERIMENT 1

Crystalline silicate 1 was isolated from sample 1 by centrifuging at 10,000 revolutions per minute. After washing with water until the pH of the wash water was about 8, drying at 120° C. and calcining for one hour in air at 500° C., silicate 1 had the following properties:

(a) thermally stable up to a temperature of at least 800° C.;
(b) an X-ray powder diffraction pattern substantially corresponding with that given in Table B;
(c) an $SiO_2/Al_2O_3$ molar ratio of 200;
(d) an average crystallite size of 400 nm.

EXPERIMENT 2

Sample 2 was conducted over a coarse paper filter ("WEISBAND"-589). Silicate 1 passed the filter unhindered.

EXPERIMENT 3

Sample 3 was conducted over a fine glass filter (G-4). The filter was completely blocked by silicate 1 within a very short time.

EXPERIMENTS 4–8

To each of the samples 4–8 a liquid was added in a quantity by volume equal to that of the sample concerned. The liquids used were: diethyl ether, ethylene glycol, n-hexanol, ammonia and formic acid. The mixtures obtained were conducted over the coarse paper filter of experiment 2 and over the fine glass filter of experiment 3. In neither case was the addition of the liquid found to have an influence on the filterability. When the coarse paper filter was used, silicate 1 passed the filter unhindered, and when the fine glass filter was used, the filter was completely blocked by silicate 1 within a very short time.

EXPERIMENT 9

To sample 9 methanol was added in a quantity by volume equal to that of the sample (50%v methanol in the mixture to be filtered). The filterability of the mixture was found to be excellent, both over the coarse paper filter of experiment 2 and over the fine glass filter of experiment 3.

EXPERIMENT 10

To sample 10 methanol was added in a quantity by volume corresponding with ⅓ of the sample (25% methanol in the mixture to be filtered). The mixture was passed over the coarse paper filter of experiment 2 and over the fine glass filter of experiment 3. In both cases the addition of methanol was found to have no effect on the filterability.

EXPERIMENTS 11–16

To each of the samples 11–16 an organic solvent was added in a quantity by volume equal to that of the sample concerned (50%v organic solvent in the mixture to be filtered). As organic solvents were used: ethanol, propanol-1, propanol-2, acetone, dimethyl sulphoxide and tetrahydrofuran. The mixtures were found to be excellently filterable, both over the coarse paper filter of experiment 2 and over the fine glass filter of experiment 3. The good filtration results were comparable with those obtained in experiment 9.

EXPERIMENT 17

From sample 17 the crystalline silicate 2 was isolated by centrifuging at 10,000 rev/min. After washing with water until the pH of the wash water was about 8, drying at 120° C. and calcining for one hour in air at 500° C. the silicate 2 had the following properties:

(a) thermally stable up to a temperature of at least 800° C.;
(b) an X-ray powder diffraction pattern substantially equal to that given in Table B;
(c) an $SiO_2/Al_2O_3$ molar ratio of 1200;
(d) an average crystallite size of 200 nm.

EXPERIMENT 18

Sample 18 was passed over the coarse paper filter of experiment 2. The silicate 2 passed the filter unhindered.

EXPERIMENT 19

Sample 19 was passed over the fine glass filter of experiment 3. The filter was completely blocked by silicate 2 within a very short time.

EXPERIMENT 20

To sample 20 ethanol was added in a quantity by volume equal to that of the sample (50%v ethanol in the mixture to be filtered). It was found that the mixture was excellently filterable, over the coarse paper filter of experiment 2 as well as over the fine glass filter of experiment 3.

What is claimed is:

1. A process for separating by filtration a fine-crystalline silicate having an average crystallite size of less than 750 nm from an aqueous reaction mixture in which said silicate is present after crystallization, which comprises adding to the mixture to be filtered an organic solvent that is miscible with water in an amount sufficient to give at least 30%v (based on said mixture) of said solvent, which organic solvent has been selected from the group consisting of monohydric alcohols, ketones, sulphoxides and cyclic ethers which, per molecule, contain at most five carbon atoms; filtering said reaction mixture; and recovering the fine-crystalline silicate from the filter.

2. The process of claim 1 wherein the mixture to be filtered contains at most 60%v of the organic solvent.

3. The process of claims 1 or 2 wherein the mixture to be filtered contains 35–55%v of the organic solvent.

4. The process of claim 3 wherein the organic solvent contains at most four carbon atoms.

5. The process of claim 1 wherein the organic solvent is recovered from the filtrate and re-used in the process.

6. The process of claim 5 wherein an organic solvent with a boiling point below 100° C. is used and the solvent is recovered from the filtrate by distillation.

7. The process of claim 6 wherein the organic solvent has a boiling point below 85° C.

8. The process of claim 7 wherein the organic solvent has a boiling point between 50° and 80° C.

9. The process of claim 8 wherein the fine-crystalline silicate is an aluminum silicate.

* * * * *